United States Patent [19]
Allard

[11] 3,951,515
[45] Apr. 20, 1976

[54] FIBER OPTIC HULL PENETRATOR WITH HIGH CHANNEL DENSITY

[75] Inventor: Frederick C. Allard, Mystic, Conn.

[73] Assignee: The United States of America as represented by the Secretary of the Navy, Washington, D.C.

[22] Filed: June 20, 1975

[21] Appl. No.: 588,747

[52] U.S. Cl. .......................... 350/96 C; 350/96 WG
[51] Int. Cl.² ........................................... G02B 5/16
[58] Field of Search ........... 350/96 C, 96 B, 96 WG, 350/319

[56] References Cited
UNITED STATES PATENTS

| | | | |
|---|---|---|---|
| 3,504,984 | 4/1970 | Bush | 350/96 BC |
| 3,825,320 | 7/1974 | Redfern | 350/96 C |
| 3,883,681 | 5/1975 | Campbell | 350/96 C |

FOREIGN PATENTS OR APPLICATIONS

| | | | |
|---|---|---|---|
| 1,922,924 | 11/1970 | Germany | 350/96 BC |

OTHER PUBLICATIONS
"Fiber Optic Coupler" by Bloem et al. IBM Tech. Disc. Vol. 16, No. 1, June 73, pp. 146-147.

Primary Examiner—John K. Corbin
Assistant Examiner—Stewart Levy
Attorney, Agent, or Firm—Richard S. Sciascia; Arthur A. McGill; Prithvi C. Lall

[57] ABSTRACT

An aperture in a hull is sealed by a fiber optic plug system that comprises a coherent array of optical fibers that are fused to form the mechanical and structural equivalent of a thick glass plate. Identical terminal blocks are located on either side of the plug. The blocks comprise a plurality of fiber optic channels supported by a matrix. At the end of each block closest to the plug, channels are arrayed in a tightly packed pattern to reduce the size of the aperture in the hull. The other end of the blocks are expanded to allow each channel to be easily accessed via discrete fiber optic cables.

6 Claims, 1 Drawing Figure

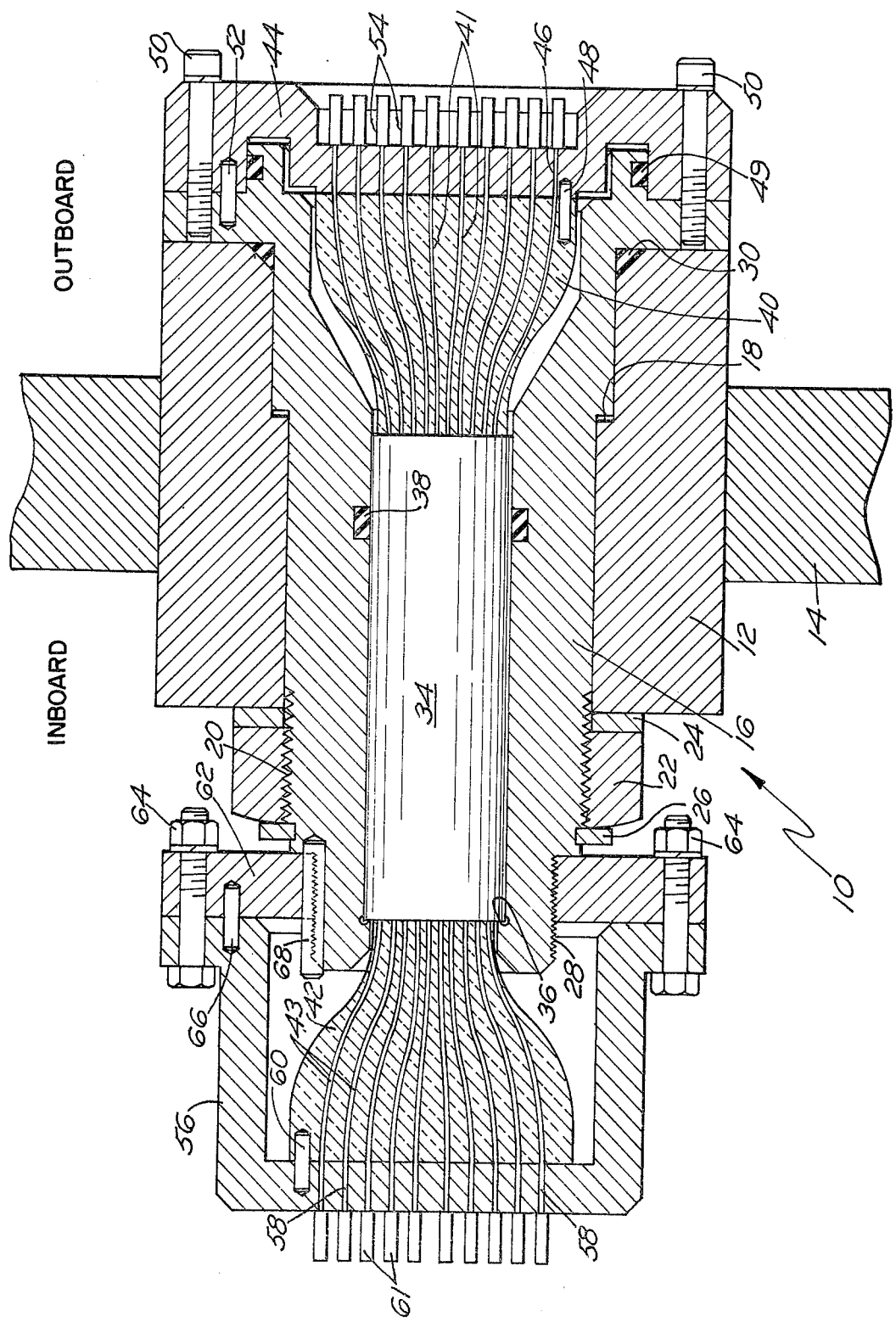

FIBER OPTIC HULL PENETRATOR WITH HIGH CHANNEL DENSITY

STATEMENT OF GOVERNMENT INTEREST

The invention described herein may be manufactured and used by or for the Government of the United States of America for governmental purposes without the payment of any royalties thereon or therefore.

BACKGROUND OF THE INVENTION

The present invention generally relates to bulkhead connectors and more particularly to a watertight connector seal for fiber optic components.

A prior bulkhead penetrating connector provides means for a single fiber optic strand to pass through a bulkhead. Non bulkhead penetrating connectors have also been disclosed that provide for multi-channel operation by connecting a plurality of strands of one cable to a plurality of strands in a second cable. The above prior art fails to provide for watertight integrity in a fiber-optic multi-channel connector particularly where it is desirable at times to disconnect a connecting fiber optic cable.

SUMMARY OF THE INVENTION

It is therefore a general object and purpose of the present invention to provide an improved fiber optic hull penetrator. It is a further object that the penetrator provides a water-tight seal. An additional object is that connecting cables be disconnectable while maintaining watertight integrity. Further objects are that it be multi-channel, low distortion, small, low in cost, free from maintenance and light in weight. These and other objects of the invention and the various features and details of construction and operation will become apparent from the specification and drawing.

This is accomplished in accordance with the present invention by providing a removable and disconnectable multichannel fiber optic bulkhead penetrator with watertight integrity. A fiber optic plug abuts matrix blocks of varying crosssectional area at either end to permit mating with further fiber optic strands at the end opposite to the plug. The fiber optic plug provides conduction when in use and in addition is mounted so as to provide a watertight seal at all times.

BRIEF DESCRIPTION OF THE DRAWING

The FIGURE is a cross-sectional view of the present invention.

DESCRIPTION OF THE PREFERRED EMBODIMENT

Referring now to the FIGURE there is generally shown a hull penetrator 10 suitable for use underwater on a submerged or surface vessel. The penetrator 10 has an annular hull fitting 12 that is welded to the hull 14. The remaining portion of penetrator 10 is mounted on fitting 12 and may be easily removed for replacement of components or for capping when not in use.

A receptacle body 16 is located inside and in juxtaposition to fitting 12. The body 16 is a first shoulder 18 for positioning and first threads 20 for securing thereto a nut 22 in contact with a washer 24. On the opposite side of nut 22 is a retaining ring 26. A second set of threads 28 are formed near the inboard end of receptacle body 16. An O-ring 30 is utilized to provide a watertight seal between receptacle body 16 and fitting 12.

A fiber optic plug 34 is inserted in the annular portion of receptacle body 16. The plug 34 rests on a second shoulder 36 of receptacle body 16. An O-ring 38 provides a seal between plug 34 and receptacle body 16. The plug 34 is a commercially available element comprising parallel fiber optic elements bunched together to transmit signals therethough without the necessity of individual alignment of the fiber optic elements within the plug 34 to transmitting and receiving components.

First and second identical tapered matric blocks 40 and 42, respectively, have a plurality of respective separate fiber optic channels 41 and 43. The spacing between the channels 41 and 43 expands between the narrow and broad ends of blocks 40 and 42. The respective channels 41 and 43 within blocks 40 and 42 must be aligned with each other for proper transmission of a signal. Both blocks 40 and 42 at their narrow end abut with plug 34. Due to the nature of plug 34, there is no need for alignment of any of the channels 41 or 43 of blocks 40 and 42 with particular fiber optic elements within plug 34.

Block 40 at its broad end abuts outboard receptacle cap 44. The cap 44 has a plurality of apertures 46 that are aligned with the channels of block 40 by means of registration pin 48. Cap 44 is connected to and aligned with receptacle body 16 by means of threaded screws 50 and registration pin 52. An O-ring 49 forms a seal between cap 44 and body 16. Fiber optic terminations 54 are then affixed in alignment with apertures 46. Outboard fiber optic strands may then be aligned and connected to the terminations 54 either individually or in a cable bundle for signal transmission.

The second tapered block 42 at its wide end abuts inboard receptacle cap 56. Apertures 58 within cap 56 are aligned with the channels 43 of block 42 by means of registration pin 60. Fiber optic termination 61 are then affixed to cap 56 in a similar manner to those on the outboard side so that fiber optic strands may be affixed thereto. Cap 56 is connected to and aligned with a threaded collar 62 by means of nut and bolt arrangements 64 and registration pin 66. The collar 62 is threaded onto receptacle 16 and the two components are aligned by means of pin 68.

In this manner it can be seen that the channels within tapered blocks 40 and 42 are aligned with each other for transmission of a signal by aligning each block with receptacle body 16. There has therefore been described a device for insertion into the underwater portion of the hull of a vessel for signal transmission. The device is capable of transmitting upwards of 30 times as many signals as any devices heretofore known. When not in use the device can be removed and replaced by a suitable watertight cap or stopper.

It will be understood that various changes in the details, materials, steps and arrangement of parts, which have been herein described and illustrated in order to explain the nature of the invention, may be made by those skilled in the art within the principle and scope of the invention as expressed in the appended claims.

What is claimed is:

1. A fiber optic hull penetrating assembly adapted to be inserted in a hull aperture comprising:
   an annular receptacle body adapted to be inserted in said hull aperture;
   a solid cylindrical fiber optic plug inserted in said annular receptacle body;

a pair of identical fiber optic blocks with each of said blocks abutting opposite sides of said plug and said blocks having a plurality of fiber optic channels;

first connecting means adapted for holding said annular receptacle body in said aperture;

second connecting means for holding said plug between said pair of fiber optic blocks; and registration means for respectively aligning said fiber optic blocks plurality of fiber optic channels with each other.

2. A fiber optic hull penetrating assembly according to claim 1 wherein each of said pair of fiber optic blocks have a tapered cross-sectional area with the end abutting said plug having smaller cross-sectional area than the opposite end and the channels more tightly packed at the end abutting said plug than the opposite end.

3. A fiber optic hull penetrating assembly according to claim 2 wherein said first connecting means further comprises a threaded nut and retaining ring.

4. A fiber optic hull penetrating assembly according to claim 3 further comprising:

a hull fitting adapted to be located in said hull aperture intermediate the hull and said annular receptacle body said hull fitting having a shoulder for abutting said annular receptacle body; and an O-ring for providing a water seal adapted to be located intermediate said hull fitting and said receptacle body.

5. A fiber optic hull penetrating assembly according to claim 4 wherein said second connecting means further comprises:

a pair of end caps abutting respective opposite ends of said blocks, said end caps having apertures adapted for transmission of signals, said end caps being connected to said annular receptacle body; and a threaded collar connected intermediate one of said end caps and said annular receptacle body.

6. A fiber optic hull penetrating assembly according to claim 5 wherein said registration means further comprise:

first alignment means for registering one of said block with one of said end caps so that said apertures of said one end cap are aligned with the channels of said one block;

second alignment means for registering the other of said blocks with the other of said end caps so that said apertures of said other end cap are aligned with the channels of said other block;

third alignment means for registering said one end cap with said annular receptacle body;

fourth alignment means for registering said other end cap with said threaded collar;

fifth alignment means for registering said threaded collar with said annular receptacle body; and said first, second, third, fourth and fifth alignment means being so registered for respectively aligning said fiber optic blocks plurality of fiber optic channels with each other.

* * * * *